United States Patent
Patel (10) Patent No.: US 8,278,631 B2
(45) Date of Patent: Oct. 2, 2012

(54) TIME-TEMPERATURE, UV EXPOSURE AND TEMPERATURE INDICATOR

(76) Inventor: Gordhanbhai N. Patel, Somerset, NJ (US)

( * ) Notice: Subject to any disclaimer, the term of this patent is extended or adjusted under 35 U.S.C. 154(b) by 0 days.

(21) Appl. No.: 12/293,322

(22) PCT Filed: Oct. 6, 2006

(86) PCT No.: PCT/US2006/039457
§ 371 (c)(1),
(2), (4) Date: Sep. 17, 2008

(87) PCT Pub. No.: WO2007/117273
PCT Pub. Date: Oct. 18, 2007

(65) Prior Publication Data
US 2009/0128345 A1    May 21, 2009

(51) Int. Cl.
*G01N 21/91*    (2006.01)
*G01N 21/00*    (2006.01)
(52) U.S. Cl. .................................. 250/474.1; 250/482.1
(58) Field of Classification Search ............... 250/474.1, 250/482.1, 475.2, 483.1, 484.2–484.5, 486.1
See application file for complete search history.

(56) References Cited
U.S. PATENT DOCUMENTS
5,420,000 A    5/1995   Patel et al. .................... 430/332

FOREIGN PATENT DOCUMENTS
WO    WO 2004077097 A2 *   9/2004

OTHER PUBLICATIONS

Rriel et al "Self-Indicating Radiation Alert Dosimeter (SIRAD)" Radiation Protection Dosimetry Epub Mar. 24, 2006, 120(1-4): 259-262; entire document.
Bak et al. Assessing and Evaluating the Self-Indicating Instant Radiation Alert Dosimeter (SIRAD), <www.sirad-usa.com/CCC_Higley_paper.pdf>, retrieved from the Internet Jul. 29, 2007, entire document.
International Search Report, PCT/US 06/39457, Oct. 7, 2009, L. Young (11pgs).

* cited by examiner

*Primary Examiner* — Walter L Lindsay, Jr.
*Assistant Examiner* — Jessica L Eley
(74) *Attorney, Agent, or Firm* — Joseph T. Guy; Nexsen Pruet, LLC (57) ABSTRACT

Disclosed is a device for monitoring one or more of integral value of time and temperature, UV light exposure and a pre-determined temperature of an item. The device is useful for monitoring items or materials which are sensitive to time-temperature, UV light and/or a pre-determined temperature. Radiation sensitive devices such as self-indicating instant radiation alert dosimeters (SIRAD) can be accidentally, inadvertently or intentionally over exposed to time-temperature, UV light and a pre-determined higher temperature. Such over exposure can provide a false positive or false negative signal. A device based on polymerization of diacetylenes and melting of partially polymerized diacetylenes, both of which are associated with color changes, are proposed as false positive, false negative, and tamper indicator.

29 Claims, 2 Drawing Sheets

TIME-TEMPERATURE, UV EXPOSURE AND TEMPERATURE INDICATOR

STATEMENT OF FEDERAL FUNDING

This invention was made in part with government support under contract W91CRB-04-C-0001 awarded by the U.S. Department of Defense and Technical Support Working Group, Department of Homeland Security.

BACKGROUND OF THE INVENTION

1. Field of the Invention

This invention relates to a device for monitoring tampering and false positive or false negative signals for materials and items such as self-developing instant radiation alert dosimeter (SIRAD) which are sensitive to UV light, time-temperature and higher temperatures.

2. Brief Description of Prior Art

Figure 1:
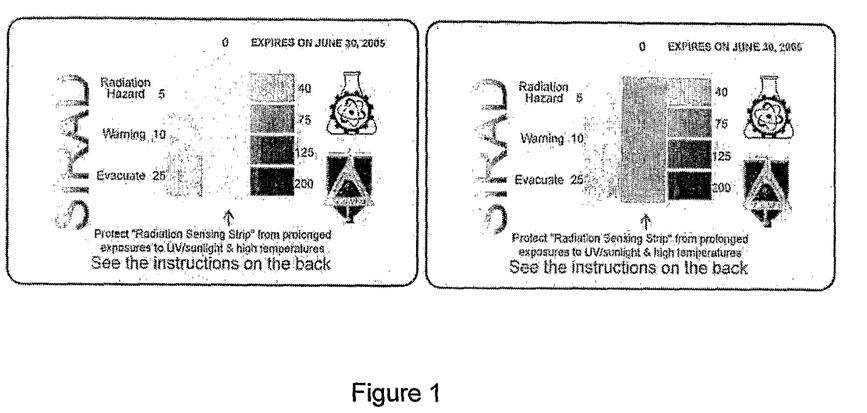
FIG. 1 shows a representation of a single sensor SIRAD card without any indicator before (left hand side) and after (right hand side) exposure to 100 rads of 100 KeV X-ray.

Radiation sensitive materials, such as diacetylenes (R—C≡C—C≡C—R, where R is a monovalent group) and processes that can be used for making radiation sensitive coatings or strips for making self-indicating instant radiation alert dosimeter (referred herein to as SIRAD) are described in patent application numbers WO 2004/077097 and WO 2004/017095 and references cited therein. Coatings, films or plaques of radiation sensitive materials which are used for making SIRAD are individually or collectively, referred herein to as "radiation sensitive coating", "radiation sensitive strip" or "sensing strip" or "sensor". The self-developing instant radiation sensitive dosimeter (SIRAD) is typically made by sandwiching a sensitive strip between two plastic layers, wherein one is highly opaque and the other is transparent. A photo of a dual-sensor SIRAD badge is shown in FIG. 1. The SIRAD is typically used as a personal and area dosimeter for monitoring low dose (1-1,000 rads) of high energy radiation, such as X-ray, gamma ray, electrons and neutrons.

The materials that can be used for making the sensor are disclosed in patent application numbers WO 2004/077097 and WO 2004/017095 and references cited therein. One class of materials that can be used for making the sensor are conjugated alkynes referred to as diacetylenes, R—C≡C—C≡C—R, where R is a substituent group. Diacetylenes polymerize in the solid state either upon thermal annealing or exposure to high-energy radiation, such as UV and X-ray [Adv. Polym. Sci., vol. 63, 1 (1984)]. The term diacetylene(s) is used herein to designate a class of compounds having at least one —C≡C—C≡C— functionality group. The solid monomers are colorless or white. The partially polymerized diacetylenes are blue or red. Polydiacetylenes appear metallic typically having a copper or gold color. Polydiacetylenes are highly colored because the "π" electrons of the conjugated backbone are delocalized. The color intensity of the partially polymerized diacetylenes is proportional to the percent polymer conversion. Diacetylenes which develop blue color are referred to herein as blue diacetylenes or blue developing diacetylenes and those that develop red color are referred to as red diacetylenes or red developing diacetylenes.

Diacetylenes are known to crystallize into more than one crystallographic modification or phase. The following terminologies are used for defining the reactivity (polymerizability) of a diacetylene. The polymerizable form of a diacetylene(s) is referred to as "active". If a diacetylene is polymerizable with radiation having energy higher than 4 eV, wavelength shorter than 300 nm, then it is referred to as "radiation active". If it is polymerizable upon thermal annealing then it is referred to as "thermally active". A form of diacetylene, which displays little or no polymerization, is referred to as "inactive". If it displays little polymerization with radiation (having energy higher than 4 eV) then it is referred to as "radiation inactive" and if it is significantly nonpolymerizable upon thermal annealing, then it is referred to as "thermally inactive". Diacetylenes having reactivity/polymerizability characteristics in between these definitions are referred to as "moderately active". The most preferred form of diacetylene for the sensor of SIRAD is one which is highly radiation reactive and displays little or no thermal reactivity. However, diacetylenes, which are radiation active also usually, have some thermal reactivity.

The radiation sensor remains active and can keep on accumulating dose unless fixed, or made inactive. In order to archive the exposure/results, the dosimeter needs to be fixed. The dosimeter can be fixed, by heating the sensor of the dosimeter till diacetylene becomes inactive and crystallizes into an inactive phase or forms a solid solution with binder or dissolution with other additives and does not re-crystallize in active form. For example, diacetylene 166 [R—C≡C—C≡C—R, where R is a $CH_2OCONH(CH_2)_5CH_3$] can be fixed by heating above about 80° C. and many diacetylenes can be fixed by forming a solid solution with a proper binder. Exemplary examples include 4BCMU [R—C≡C—C≡C—R, where R is a $(CH_2)_4OCONHCH_2COO(CH_2)_3CH_3$] and 344 [R—C≡C—C≡C—R, where R is a $(CH_2)_3OCONH(CH_2)_3CH_3$] with binders such as polyvinylacetate and polymethylmethacrylate. Many additives, such as trihydroxybenzoic acid which react and/or dissolve the diacetylene can also be used to fix the dosimeter.

The sensing materials, diacetylenes, used to make the sensor of SIRAD for monitoring X-ray, are also sensitive to UV light. In order to make the sensor less sensitive to UV light, UV absorbers are preferably added in the coating formulation and the sensor is further protected with a UV absorbing coating or a film. The sensor of SIRAD is sensitive to prolonged exposure to UV and/or sunlight. It is not possible to filter off 100% of the UV light. A small fraction of UV light, preferably less than a percent, passes through the UV absorbing materials and upon such prolonged exposure, the sensor develops a faint color, which is a false positive indication for high energy radiation. The sensor can accidentally, inadvertently or unintentionally be over exposed to sunlight which can provide a false positive. At the same time, someone can tamper with the sensor by exposing the sensor to sunlight, intentionally or otherwise, and claiming exposure to ionizing radiation. Hence, there is a need for detecting a false positive due to unintentional or intentional exposure to UV/sunlight.

SIRAD dosimeters also have limited shelf life of typically about one year at room temperature and they develop color with time and temperature. If stored at higher temperature, such as at body temperature, during the use or at higher temperature during storage, the color development is faster. Storing SIRAD dosimeters at higher temperatures will reduce the shelf life and could also provide a false positive signal. Hence, there is a need for monitoring shelf-life, and particularly integrated time and temperature. These shelf life, or time-temperature, indicators are referred herein to as TTI or shelf life indicators. If the SIRAD dosimeters are over exposed to time and temperature, a TTI can indicate expiration of shelf life. The TTI can also indicate false positive due to storage for a longer time and at higher temperatures.

Depending upon the conditions and composition, the reactivity (polymerization) of diacetylenes sometimes changes when heated above their melting point followed by cooling/crystallizing at room temperature (RT). Some diacetylenes become inactive while others change their reactivity to temperature and radiation upon crystallization from a melt. If a diacetylene used for making the sensor changes its reactivity upon heating at high temperatures by any process including melting, phase change, dissolution, formation solid solution with other compounds and chemical reaction, the sensor could provide false positive or false negative signal. Hence, such heating above a pre-determined temperature should be monitored, i.e., the SIRAD type dosimeters need a temperature indicator.

A partially polymerized diacetylene (PPD) is a solid solution of monomer molecules and polymer chains. PPDs are either blue or red. Some PPDs change their colors, e.g., blue-to-red or red-to-blue, when heated above the melting point of the monomer. For example, when a partially polymerized 4BCMU [R—C≡C—C≡C—R, where R is a $(CH_2)_4$ $OCONHCH_2COO(CH_2)_3CH_3$] is heated above its melting point, or above about 80° C., it changes from blue-to-red irreversibly. Similarly when a partially polymerized 166 [R—C≡C—C≡C—R, where R is a $CH_2OCONH(CH_2)_5$ $CH_3$] is heated above its melting point, or above about 80° C., it changes from red-to-blue irreversibly. Thus partially polymerized diacetylenes, including those used for making sensors, if pre-partially polymerized, such as with UV light, can be used for monitoring the exposure of a pre-determined high temperature.

Diacetylenes are known yet their use in monitors has been somewhat limited due to the propensity for false positive readings, due to UV exposure and the like, and false negative readings, due to thermal deactivation or change in reactivity.

SIRAD type dosimeters are typically of credit card size and there is no room for applying monitors/indicators/detectors for the above four processes. Sometimes SIRAD indicators are even smaller, e.g., a small sticker of 1 cm×1 cm, known as stick-on SIRAD. These stick-on SIRAD are useful for instantly monitoring exposure to high dose, especially when applied on to other dosimeters, such as those based on X-ray film, TLD (thermoluminescence dosimeter) and OSL (optically simulated luminescence). Hence, there is a need for a small and all-in-one indicator which can monitor all of the above processes and indicate via color change.

In order to detect/monitor the effect of time and temperature, UV exposure and/or temperature there is a need for such indicators. These indicators which monitor/detect effects of time-temperature, UV light and/or temperature are referred to herein as TUT indicators for monitoring integral value of "Time-temperature", UV light", and/or a pre-determined higher "Temperature".

Diacetylenes are also proposed as TTI e.g., U.S. Pat. Nos. 3,999,946; 4,276,190; 4,208,186; as thermochromic materials e.g., 4,215,208; 4,235,108; 4,452,995 and as radiation dosimeter e.g., 4,788,432. Patent application number WO 2004/077097 and WO 2004/017095 disclose use of time-temperature indicator, UV indicator and temperature indicators for monitoring shelf life, over exposure to UV light and higher temperature as an individual indicator for SIRAD. However, it has not been previously considered to use diacetylenes as TTI, radiation and temperature indicator all-in-one.

The SIRAD dosimeter cards could be made by techniques and materials described in Patent Application # WO2004077097—"Personal And Area Self-Indicating Instant Radiation Alert Dosimeter" and the following patent applications: "A Stick-on Self-indicating Instant Radiation Dosimeter" filed with the US Patent and Trademark Office as U.S. patent application Ser. No. 11/269,147, filed Nov. 8, 2005; and "Tamper Resistant Self Indicating Instant Alert Radiation Dosimeter" filed with the US Patent and Trademark Office as U.S. patent application Ser. No. 11/235,892, filed Sep. 27, 2005.

SUMMARY OF THE INVENTION

Disclosed is an indicating device undergoing at least one color change, color intensification, color development including change in fluorescence, composed of at least one color changing compound, e.g., diacetylene (R—C≡C—C≡C—R, where R is a group) for monitoring integral value of time and temperature, exposure to UV light and a pre-determined high temperature. Such device is referred to as TUT indicator.

Provided is the TUT device for monitoring a false positive signal, false negative and tampering in a radiation sensitive device (SIRAD).

Provided is the TUT device for monitoring expiration of shelf life.

Provided is the TUT device for monitoring UV exposure.

Provided is the TUT device for monitoring exposure to a temperature above a pre-determined level.

Provided is a process of applying the TUT indicator on SIRAD.

Provided is a process of monitoring exposure to time-temperature, UV light and/or a pre-determined higher temperature and tampering by monitoring the color of the TUT.

Further provided is a process of monitoring for tampering of a radiation sensitive device like SIRAD by comparing color of the TUT indicator with a color bar, or a color bar of a color reference bar printed on SIRAD.

Further provided is a process of monitoring the effect of time-temperature, UV light and/or a pre-determined higher temperature by monitoring color changes of a TUT indicator with an optical densitometer or a spectrophotometer.

These and other advantages, as will be realized, are provided in an indicating device with a high energy radiation monitor capable of undergoing at least one color change in proportion to a dose of the high energy radiation and a second monitor capable of monitoring at least one of integral value of time and temperature, exposure to UV light and/or a pre-determined high temperature.

Yet another embodiment is provided in a detector or monitor for high energy radiation. The detector or monitor has a first indicator capable of changing first color density in response to a primary radiation at a first rate and in response to a second radiation at a second rate. A second indicator or monitor is provided which is capable of changing second color density in response to the second radiation at a third rate wherein the first rate and said third rate are faster than the second rate.

Yet another embodiment is provided in a detector or monitor with a high energy radiation detector or monitor having a first diacetylene capable of changing a first color density proportional to a dose of the high energy radiation. The high energy radiation detector or monitor also changes first color density proportion to at least one of time-temperature, UV exposure or excessive heat. A second detector or monitor has a second diacetylene wherein the second detector or monitor changes second color density proportional to at least one of time-temperature, UV exposure or excessive heat.

DETAILED DESCRIPTION OF PREFERRED EMBODIMENTS

The sensing materials, diacetylenes, used for making the sensor for monitoring X-ray, are also sensitive to UV light. In order to make the sensor less sensitive to UV light, UV absorbers are preferably added in the coating formulation and the sensor is further protected with a UV absorbing film as described in Patent Application No. WO2004077097. However, the sensor of SIRAD is sensitive to prolonged exposure to UV light. The sensor can accidentally or unintentionally be over exposed to sunlight which can provide a false positive. At the same time, someone can tamper with the sensor by exposuring the sensor intentionally to sunlight and claiming exposure to ionizing radiation. Hence, there is a need for detecting a false positive due to unintentional or intentional exposure to UV/sunlight.

The sensing materials, diacetylenes, used for making the sensor for monitoring X-ray, are also sensitive to prolonged exposure to higher temperatures. The sensor has limited shelf life, of about one year at room temperature (RT). In order to make the sensor less sensitive to temperature and to increase the shelf life, shelf life extenders are added in the coating formulation as described in Patent Application No. WO2004077097. However, the sensor of SIRAD is sensitive to prolonged exposure to higher temperatures. The sensor can accidentally or unintentionally be over exposed to temperature higher than RT or recommended use temperature which can provide a false positive. At the same time, someone can tamper, with the device and expose the sensor intentionally to higher temperature, such as 60° C. for a month. Hence, there is a need for detecting a false positive due to unintentional or intentional exposure to higher temperatures.

The sensing materials, diacetylenes, used for making the sensor for monitoring X-ray, often become inactive to ionizing radiation if heated near or above their melting points. In order to keep the sensor active during normal use, including a pass through a laundry cycle (washing and drying usually below 80° C.), diacetylenes used for making the sensor should have a melting point higher than 80° C. However, the sensor of SIRAD becomes inactive to radiation if the diacetylene melts. The sensor can accidentally or unintentionally be heated above the melting point of the diacetylene used for making the sensor. This will make the SIRAD inactive to radiation and therefore it will not be able to monitor X-ray or may monitor lower dose. If this is the case, SIRAD can provide a false negative signal. Hence, there is a need for detecting a false negative due to unintentional or intentional exposure of the sensor to a very high temperature or inactivation temperature. The temperature indicator is required especially when diacetylene used for making the sensing strips changes it reactivity at a much lower temperature such as 50° C.

Diacetylenes change their radiation and thermal reactivities near and above their melting points. When heated near or above the melting point and cooled to a lower temperature, e.g. ambient temperature, the resultant re-crystallized diacetylene could have different radiation and thermal reactivities. If the reactivity is higher, for a given dose it could provide a darker color which would be a false positive result. If the radiation reactivity is lower, for a given dose it could provide a lighter color which would be a false negative result. Hence, there is a need to monitor the temperature of the SIRAD dosimeter.

Provided is an indicator which can monitor one or more of the above described events. The invention can be best described by reference to the FIGS. 1-3.

FIG. 1 shows a representation of a single sensor SIRAD card without any indicator before (left hand side) and after (right hand side) exposure to 100 rads of 100 KeV X-ray. The card has a black protective film cover which is not shown. The sensor of the SIRAD card also develops blue color upon prolonged exposure to UV light and higher temperatures. A person who is unaware of the X-ray exposure, can determine if the color development is genuine or false positive and vice versa.

Figure 2:
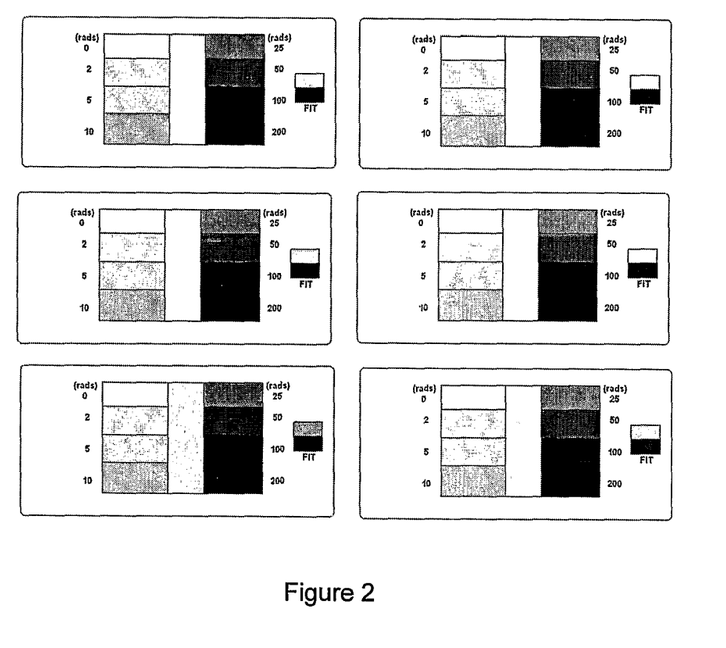
FIG. 2 is a schematic representation of SIRAD cards with a TUT indicator under different treatments.

FIG. 2 is a schematic presentation of SIRAD cards with a TUT indicator under different treatments. The cards can have printing (not shown in FIG. 2) to indicate how to interpret the card such as: "If the bottom half of the TUT indicator has changed from blue to red, SIRAD is inactive to X-ray and if the upper half is bluer than the 10-rads bar, the shelf life has expired and/or exposure to UV light and/or higher temperature for a prolonged period has occurred. Don't use this SIRAD card in such cases".

In FIG. 2, the top left card is illustrated before any treatment. The card comprises a central vertical bar which represents no exposure by a lack of shading. On either side of the central vertical bar is a progressive scale indicating the color of the central bar as a function of exposure. While not indicated the central vertical bar preferably turns progressively darker blue with high energy radiation with the degree of radiation indicated by matching the blue color with that of the scale. A TUT indicator, labeled FIT, is illustrated on the right side in approximately the middle of the card. The upper portion of the TUT indicator is either colorless or very light blue indicating no exposure to UV-light, heat or excessive time. The card of the top right illustrates the effect of overheating. The central vertical bar indicates no exposure whereas the lower half of the TUT indicator is red indicative of heating. This indicates that the card has been inactivated relative to detection of high energy radiation. The bottom half of the TUT indicator changed from blue to red which indicates that the sensor is inactive to X-ray. The card at the central left is illustrated to indicate that the card has been used for some time, such as till a ⅓ of shelf life is expired, or that the card has been stored at higher temperatures or exposed to UV light for a short period but not sufficient for the sensor to develop any noticeable color. The TUT indicator has developed a very faint blue color but not darker than the 10-rad bar indicating that the card is active and usable. This 10-rad bar reference point can be changed depending upon the reactivities of the sensor and that of TUT indicator. The card at the central right hand side is indicative of a card after heating above the melting point of the sensor. The bottom half of the TUT indicator changed from blue to red and the top half changed to faint blue to faint red. If the TUT indicator is red, it indicates that the card is inactive. The card at the bottom left hand side is indicative of shelf life expiration or exposure for a sufficiently long time to UV light for the sensor to develop a noticeable color. This is indicated by the upper half of the TUT indicator which is bluer than the 10-rad bar. This means SIRAD is either deliberately or inadvertently exposed to higher temperatures and/or UV light for a prolonged period and must not be used or the card must be replaced. The bottom right hand side card illustrates a card after heating above the melting point of the sensor. The bottom half of TUT indicator changed from blue to red and the top half change from light blue to light red. If the TUT indicator is red, it indicates that the card is inactive.

A particular advantage of the present invention is the coupling of a primary SIRAD detector or monitor which has the primary function of increasing color density in response to high energy radiation with a secondary TUT indicator which provides multiple degrees of detection and which can provide an indication that the card has been subjected to energy which will neutralize the SIRAD detector or monitor. It is particularly preferred that the SIRAD detector has an increasing color density with ionizing radiation particularly an increasing blue color. It is preferred that the TUT indicator have increasing blue density with time and/or UV exposure but a red density with exposure to excessive temperature. This combination allows the user to rapidly determine if the card has been subjected to excessive temperature, excess UV irradiation or excessive time all of which allow any indication of high energy radiation to be verified as authentic. It is preferred that the TUT indicator develops blue color at a rate which exceeds the development of color density in the SIRAD detector or monitor when exposed to UV radiation. This preference is based on the desire to insure that a SIRAD detector or monitor which has been damaged is detected prior to reliance on the detector or monitor for high energy radiation.

The TUT indicator either does not develop or develops a very faint color upon exposure to high energy ionizing radiation such as X-ray. Hence, in the case of a genuine X-ray exposure only the sensor develops color and not the TUT indicator. It also has significantly higher reactivity, or higher color development upon exposure to UV and temperature. As a result, when exposed to UV light or higher temperatures, it develops color faster than the sensor and can be easily differentiated.

If the sensor has no TUT indicator and is heated above its melting point or inactivation temperature, it becomes inactive to X-ray. In such a case, the sensor will not develop any color or will develop a very light color upon exposure to X-ray and can provide a false negative. If it has a TUT indicator, the temperature indicator (e.g., the bottom half) will change color from blue to red. This will indicate that SIRAD is inactive and must be replaced with an active one.

Figure 3:
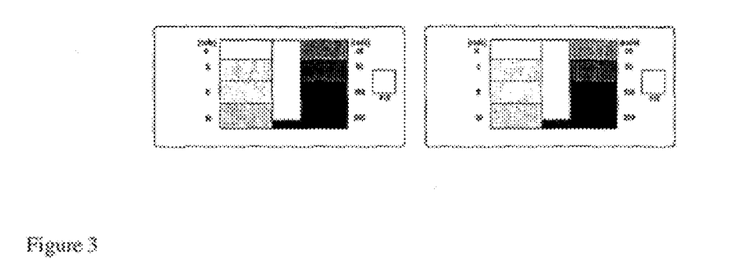
FIG. 3 is a schematic representation of SIRAD cards with a TUT indicator a portion of the sensor having capability of undergoing a color change.

FIG. 3 is a schematic presentation of a SIRAD card having the ability to indicate an exposure and to distinguish the type of exposure. At the lower extent of the central SIRAD detector or monitor is a TUT indicator. Prior to exposure to heat the TUT indicator is blue as illustrated by the card on the left. The card at the right illustrates a card after heating above the melting point of the sensor. The bottom portion of the SIRAD sensor is changed from blue to red. The bottom portion of the sensor of this type of SIRAD card is a temperature indicator. This is possible with certain diacetylenes which partially polymerize to a color upon exposure to UV light and change color when heated above a certain temperature, usually above the melting point of the monomer. For example, when a partially polymerized 4BCMU [R—C≡C—C≡C—R, where R is a $(CH_2)_4OCONHCH_2COO(CH_2)_3CH_3$] is heated above its melting point, or above about 90° C., it changes from blue-to-red irreversibly. Diacetylene fatty acids, such as tricosa-10,12-diynoic acid (TC), pentacosa-10,12 diynoic acid (PC) partially polymerize to blue color and when heated above their melting points, e.g. above about 55° C., they change to red irreversibly. Similarly when a partially polymerized 166 [R—C≡C—C≡C—R, where R is a $CH_2OCONH(CH_2)_5CH_3$] is heated above its melting point, or above about 80° C., it changes from red-to-blue irreversibly.

A preferred class of compounds for the TUT indicator are diacetylenes having general formula, R'—C≡C—C≡C—R", where R' and R" are the same or different substituent groups. Though this class of diacetylenes is preferred, other diacetylenes having the following general formulas can also be used: higher acetylenes: R'—(C≡C)$_n$—R", where n=3-5; split di and higher acetylenes: R'—(C≡C)$_m$-Z-(C≡C)$_o$—R", where Z is any diradical, such as —(CH$_2$)$_n$— and —C$_6$H$_4$—, and m and o is 2 or higher; and polymeric di and higher acetylenes: [-A-(C≡C)$_n$—B—]$_x$, where A and B can be the same or different diradical, such as —(CH$_2$)$_b$—, —OCONH—(CH$_2$)$_b$—NHCOO—, and —OCO(CH$_2$)$_b$OCO—. where R' and R" can be the same or different groups.

The preferred diacetylenes include those where R' and R" are selected from: (CH$_2$)$_b$—H; (CH$_2$)$_b$OH; (CH$_2$)$_b$—OCONH—R1; (CH$_2$)$_b$—O—CO—R1; (CH$_2$)$_b$—O—R1; (CH$_2$)$_b$—COOH; (CH$_2$)$_b$—COOM; (CH$_2$)$_b$—NH$_2$; (CH$_2$)$_b$—CONHR1; (CH$_2$)$_b$—CO—O—R1; where b=1-10, preferably 1-4, and R1 is an aliphatic or aromatic radical, e.g. C$_1$-C$_{20}$ alkyl or phenyl or substituted phenyl, and M is a cation, such as Na$^+$ or (R1)$_3$N$^+$.

The preferred diacetylenes are the derivatives of 2,4-hexadiyne, 2,4-hexadiyn-1,6-diol, 3,5-octadiyn-1,8-diol, 4,6-decadiyn-1,10-diol, 5,7-dodecadiyn-1,12-diol and diacetylenic fatty acids, such as tricosa-10,12-diynoic acid (TC), pentacosa-10,12-diynoic acid (PC), their esters, organic and inorganic salts and cocrystallized mixtures thereof. The most preferred derivatives of the diacetylenes, e.g. 2,4-hexadiyn-1,6-diol, are the urethane and ester derivatives.

Preferred urethane derivatives are alkyl, aryl, benzyl, methoxy phenyl, alkyl acetoacetate, fluoro phenyl, alkyl phenyl, halo-phenyl, cyclohexyl, toyl and ethoxy phenyl of 2,4-hexadiyn-1,6-diol, 3,5-octadiyn-1,8-diol, 4,6-decadiyn-1,10-diol, 5,7-dodecadiyn-1,12-diol. The prefer urethane derivatives are methyl, ethyl, propyl and butyl derivatives of 2,4-hexadiyn-1,6-diol, 3,5-octadiyn-1,8-diol, 4,6-decadiyn-1,10-diol, 5,7-dodecadiyn-1,12-diol.

The further preferred diacetylenes are derivatives of 3,5-octadiyn-1,8-urethane, 4,6-decadiyn-1,10-urethane and 5,7-dodecadiyn-1,12-urethane, e.g., hexyl urethane: R'=OCONH(CH$_2$)$_5$CH$_3$; pentyl urethane: R'=OCONH(CH$_2$)$_4$CH$_3$; butyl urethane: R'=OCONH(CH$_2$)$_3$CH$_3$; propyl urethane: R'=OCONH(CH$_2$)$_2$CH$_3$; ethyl urethane: R'=OCONHCH$_2$CH$_3$; methyl urethane: R'=OCONHCH$_3$.

The urethane derivatives can be prepared by reacting diacetylene-diol, e.g., 2,4-hexadiyn-1,6-diol with appropriate isocyanates (e.g. n-hexylisocyanate) in a solvent, such as tetrahydrofuran, using catalysts, such as di-t-butyltin bis(2-ethylhexanoate) and triethylamine as indicated below:

Ester derivatives can be prepared by reacting e.g., 2,4-hexadiyn-1,6-diol with appropriate acid chlorides in a solvent, such as dichloromethane, using a base, such as pyridine as the catalyst; i.e., Asymmetrical diacetylenes can be prepared by the Cadiot-Chodkiewicz type reaction methods.

Though individual diacetylenes can be used, it is desirable to alter the reactivity of diacetylenes by cocrystallization. Cocrystallization can be achieved by dissolving two or more diacetylenes, preferably conjugated, prior to molding. For example, when TC and PC are co-crystallized, the resulting cocrystallized diacetylene mixture, such as TP41 (4:1 mixture of TC:PC) has a lower melting point and significantly higher radiation reactivity. The reactivity can also be varied by partial neutralization of diacetylenes having —COOH and —$NH_2$ functionalities by adding a base, such as an amine, NaOH, $Ca(OH)_2$, $Mg(OH)_2$ or an acid, such as a carboxylic acid, respectively.

Other preferred diacetylenes are amides of fatty chain acid, such as TC and PC. The preferred amides are: TCAP=$CH_3(CH_2)_9$—C≡C—C≡C—$(CH_2)_8$—CONH—$(CH_2)_3CH_3$; PCAE=$CH_3(CH_2)_{11}$—C≡C—C≡C—$(CH_2)_8$—CONH—$CH_2CH_3$; PCAP=$CH_3(CH_2)_{11}$—C≡C—C≡C—$(CH_2)_8$—CONH—$(CH_2)_3CH_3$; PCACH=$CH_3(CH_2)_{11}$—C≡C—C≡C—$(CH_2)_8$—CONH—$C_6H_5$; and TCACH=$CH_3(CH_2)_9$—C≡C—C≡C—$(CH_2)_8$—CONH—$C_6H_5$.

Polymers having diacetylene functionality [e.g., {—R'—(C≡C)$_n$—R"—}$_x$, where R' and R" can be the same or different diradical, such as —$(CH_2)_n$—, —OCONH—$(CH_2)_n$—NHCOO— and —OCO$(CH_2)_n$OCO— in their backbones are also preferred because of the fact that they are polymeric and do not require a binder.

The most preferred diacetylenes are those which partially polymerize to blue color and change to red or vice versa when heated above certain temperature, e.g., when a partially polymerized 4BCMU [R—C≡C—C≡C—R, where R is a $(CH_2)_4$ $OCONHCH_2COO(CH_2)_3CH_3$] is heated above its melting point, e.g., above 90° C., it changes from blue-to-red irreversibly. Similarly when a partially polymerized 166 [R—C≡C—C≡C—R, where R is a $CH_2OCONH(CH_2)_5CH_3$] is heated above its melting point, e.g., above 80° C., it changes from red-to-blue irreversibly.

Diacetylenes are the preferred materials however other commercially available temperature indicators, UV monitors and temperature indicators can be utilized if desired.

The TUT indicator could have any symmetrical or asymmetrical shape. It can be circular, oval, square, rectangular or any other shape. The preferred shapes are square and circular.

The TUT indicator could be of any size desired, preferably sufficiently large to be used on SIRAD card and readable. The most preferred size is about a square centimeter.

The TUT indicator can be applied anywhere on SIRAD, e.g., in the front or back of the card. It can also be applied on other parts of SIRAD, e.g., black protective cover. The preferred location is the front of the card and near the sensor.

The TUT indicator can be made separately and applied on SIRAD or can be directly coated on SIRAD.

Any chemical/formulation which can undergo a noticeable change, e.g., change in color and/or fluorescence with time-temperature, UV light and/or temperature can be used for making the TUT indicator. For example, the chemicals/formulation/processes described in Patent Application No. WO2004077097—"Personal and Area Self-Indicating Instant Radiation Alert Dosimeter" can be used for making TUT indicator. The most preferred class of compounds are diacetylenes. The most preferred diacetylenes are those which have higher thermal and UV reactivities than that used for making the sensor and/or whose partially polymerized diacetylenes which undergo a color change, e.g., blue to red when the sensor becomes inactive to radiation. For example, preferred diacetylenes for TUT indicator are (1) 166 [R—C≡C—C≡C—R, where R is a $CH_2OCONH(CH_2)_5CH_3$] which develops red color faster thermally and upon exposure to UV light and whose partially polymerized form changes from red to blue when heated above about 80° C.; and (2) 4BCMU [R—C≡C—C≡C—R, where R is a $(CH_2)_4$ $OCONHCH_2COO(CH_2)_3CH_3$] which develops blue color faster thermally and upon exposure to UV light and whose partially polymerized formed changes from blue to red when heated above about 80° C.

The thermal and UV reactivities of diacetylenes suitable for TUT indicator can be varied with additives such as UV absorbers and shelf life extenders as described in Patent Application No. WO2004077097—"Personal and Area Self-Indicating Instant Radiation Alert Dosimeter".

Just like the sensor, the TUT indicator could also have color reference bars of its own. However, by selecting a proper diacetylene one can use one of the bar of the color reference bars of the sensor.

It is preferred that only one TUT is used. However, more than one TUT can be used, especially if SIRAD has more than one sensor. Each sensor may have its own TUT sensors.

The coating thickness of the TUT indicator could be from a fraction of a micron to about a millimeter. The preferred thickness is about 2-50 microns.

The preferred TUT indicator should have significantly higher thermal and UV reactivities, preferably more than ten times, most preferably about twenty times that of diacetylene used for making the sensor.

The preferred temperature for the color change of the TUT indicator is at or slightly below the inactivation or change in reactivity temperature of the sensor.

One can use individual indicators for each process. A time-temperature indicator for monitoring shelf life can be used in conjunction with an indicator for over exposure to higher temperatures for a prolong period or a UV indicator for monitoring over exposure to UV light. A temperature indicator can be used to monitor change in activity of the sensor as described in Patent Application No. WO2004077097—"Personal and Area Self-Indicating Instant Radiation Alert Dosimeter". The most preferred one is the TUT indicator having all of the above in one.

The TUT indicator undergoing any noticeable color change, including intensification of a color can be used. The preferred color changes for the TUT indicator for monitoring inactivation of the sensor are blue to red or red to blue. The preferred color change/development of the TUT indicator for monitoring shelf life and UV exposure is gradual color development, e.g., blue or red. The most preferred colors are those which can match the color reference bars printed for the sensor.

The colors of the TUT indicator can be monitored visually or with an electronic equipment such a spectrophotometer or densitometer.

The composition/formulation of the TUT indicator can be dispersed in a polymeric binder so it can be coated. It may have other protective layers.

The TUT indicator can also be used for other items and devices which are sensitive to time-temperature, radiation and/or temperature. These items include radiation dosimeters such as TLD, OSL, photographic film, polymerizable monomers, radiation curable inks, printed circuit board and alike.

False signals, either positive or negative, whether inadvertent or due to tampering can create problems for the users and issuing agencies or organizations. A TUT indicator will minimize the occurrence of inappropriate or unnecessary response. A TUT indicator can detect or monitor shelf life and expiration of shelf life, prolonged exposure to elevated temperature, exposure to UV light or sunlight, exposure to high temperature sufficient to inactive the detector. These indications may be naturally occurring as a result of standard use or evidence of tampering. Therefore, the TUT indicators provide a reliability and mitigate the impact of false indications of radiation exposure or failure to accurately detect the level of radiation exposure.

EXAMPLES

Example 1

Synthesis of 166, 344 and 4BCMU Diacetylenes

Diacetylenes 166 [R—C≡C—C≡C—R, where R is a $CH_2OCONH(CH_2)_5CH_3$], 344 [R—C≡C—C≡C—R, where R is a $(CH_2)_3OCONH(CH_2)_3CH_3$] and 4BCMU [R—C≡C—C≡C—R, where R is a $(CH_2)_4OCONHCH_2COO(CH_2)_3CH_3$] were synthesized as described in U.S. Pat. No. 5,420,000.

Example 2

Making of SIRAD Cards

Sensors for making SIRAD cards similar to that shown in FIG. 1 were made using diacetylene 344 [R—C≡C—C≡C—R, where R is a $CH_2OCONH(CH_2)_5CH_3$] using formulations and procedures described in example #2 of Patent application WO2004077097.

Example 3

Making of TUT Indicator

A coating formulation of 4BCMU in polyvinyl alcohol solution was prepared according to example #20 of Patent application WO2004077097. The formulation was coated on a 50 micron thick polyester film having a coating of pressure sensitive adhesive and a release paper to get a 3 micron dry thick coating on the top. The coated film was cut into 1 square centimeter pieces and half of each piece was exposed to short wavelength UV light till it turned dark blue while keeping the other half of each piece colorless/white by covering it from UV light with a UV absorbing polyester film.

Example 4

SIRAD Card with TUT Indicator

A number of SIRAD cards with the TUT indicators of example #3 were made by applying TUT indicators on the bottom right hand side corner of SIRAD cards of Example 2.

Example 5

Monitoring Inactivation of the Sensor

A SIRAD card with a TUT indicator was placed in an oven at 100° C. for five minutes. The card was removed from the oven and cooled to room temperature. The bottom half portion of the TUT indicator had changed from blue to red. The heated card was then irradiated with 200 rads of 100 KeV X-ray along with a control card which was not heated. The sensor of the card which was heated did not develop any blue color while that of the unheated control card developed a blue color.

Example 6

Tampering SIRAD with Sunlight

A SIRAD card with a TUT indicator was placed under sunlight for a day. The sensor developed a light blue color while the upper half of the TUT indicator changed from colorless/white to a dark blue color equivalent to that developed upon exposure to a thousand rads of X-ray.

Example 7

Tampering with Higher Temperature for a Prolonged Period

A SIRAD card with a TUT indicator was placed in an oven at 70° C. for three weeks. The sensor developed a faint blue color (equivalent to about a few rads of X-ray) while the upper half of the TUT indicator changed from colorless/white to a light blue color equivalent to that developed upon exposure about 100 rads of X-ray.

Example 8

Sensor as Temperature Indicator

A sensor was made from 4BCMU as per example #21 of Patent application No. WO2004077097. About ⅛ of the 4BCMU-sensor was exposed to short wavelength UV light from a UV lamp for about ten seconds. The UV exposed portion developed a dark blue color as shown schematically in FIG. 3. A SIRAD card made from this sensor was heated in an oven at 100° C. for a few minutes. The UV exposed portion of the sensor changed from blue to red.

Similar devices were made using diacetylenes having fatty acids, such as tricosa-10,12-diynoic acid (TC), pentacosa-10,12-diynoic acid (PC).

Figure 4:
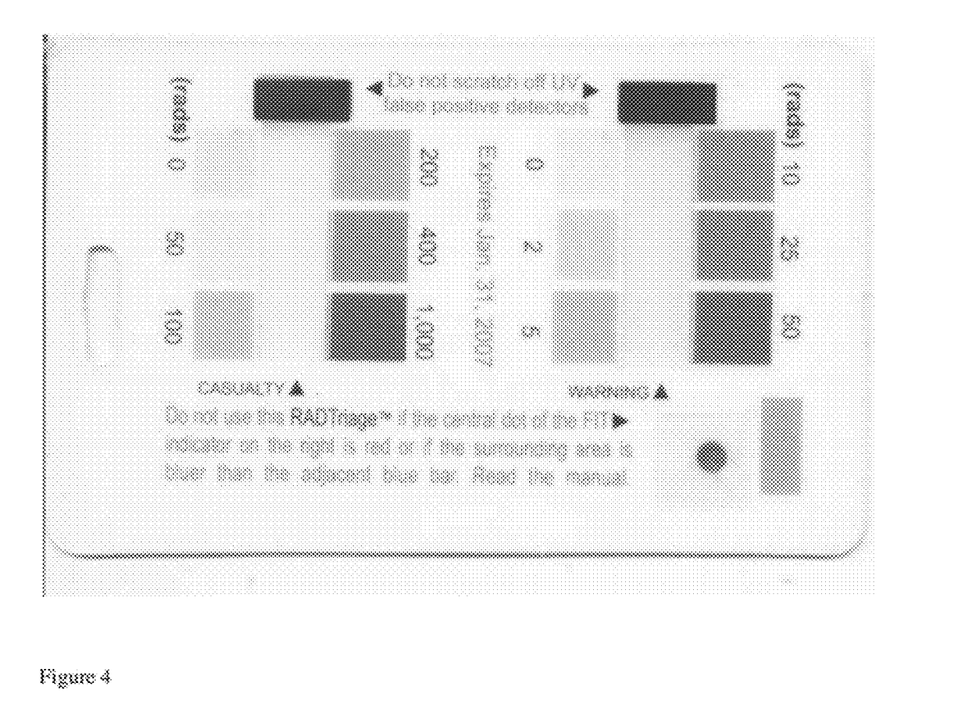
FIG. 4 is a photograph of a representative SIRAD card of the present invention.

A photograph of an actual SIRAD detector is provided in FIG. 4.

What is claimed is:

1. An indicating device comprising a first monitor capable of undergoing at least one color change in proportion to high energy radiation and a second monitor capable of monitoring integral value of one of time, temperature, time-temperature, or exposure to UV light by developing a first color and monitoring exceeding a pre-determined higher temperature by said first color changing to a second color.

2. The device of claim 1 wherein said monitoring of integral value is observed as at least one of color development, color intensification, color change or change in fluorescence.

3. The device of claim 2 wherein said color change, color development, color intensification or change in fluorescence is selected from one of colorless to blue, colorless to red, colorless to purple, blue to red or red to blue.

4. The device of claim 3 wherein said second monitor comprises at least one compound selected from diacetylene, partially polymerized diacetylene and polydiacetylene.

5. The device of claim 4 where said diacetylene is R'—C≡C—C≡C—R", where R' and R" are independently selected from: $(CH_2)_b$—H; $(CH_2)_b$OH; $(CH_2)$b-OCONH—

R1; (CH$_2$)$_b$—O—CO—R1; (CH$_2$)$_b$—O—R1; (CH$_2$)$_b$—COOH; (CH$_2$)$_b$—COOM; (CH$_2$)$_b$—NH$_2$; (CH$_2$)$_b$—CONHR1; (CH$_2$)$_b$—CO—O—R1 or a mixture thereof; where b=1-10; R1 is an aliphatic or aromatic radical and M is a cation or (R1)$_3$N$^+$.

6. The device of claim 4 wherein said diacetylene is a derivative of one of 2,4-hexadiyn-1,6-diol, 3,5-octadiyn-1,8-diol, 4,6-decadiyn-1,10-diol, 5,7-dodecadiyn-1,12-diol or mixtures thereof.

7. The device of claim 4 where said diacetylene is selected from R—C≡C—C≡C—R, where R is selected from CH$_2$OCONH(CH$_2$)$_5$CH$_3$; (CH$_2$)$_3$OCONH(CH$_2$)$_3$CH$_3$; (CH$_2$)$_4$OCONHCH$_2$COO(CH$_2$)$_3$CH$_3$; and symmetrical or asymmetrical fatty chain diynoic acids, their derivatives and salts.

8. The device of claim 7 where said diacetylene is selected from tricosa-10,12-diynoic acid, and pentacosa-10,12-diynoic acid.

9. The device of claim 1 wherein said device is used for monitoring a false positive signal in a radiation sensitive device.

10. The device of claim 1 wherein said device is used for monitoring a false negative signal in a radiation sensitive device.

11. A process of applying an indicating device comprising a first monitor capable of undergoing at least one color change in proportion to high energy radiation and a second monitor capable of monitoring integral value of time, temperature, time-temperature or exposure to UV light and a pre-determined higher temperature wherein said second monitor changes to a first color upon exposure to said time, temperature, time-temperature or UV light and said first color changes to a second color upon subsequent exposure to said pre-determined higher temperature.

12. A process of monitoring at least one of exposure to time, temperature, time-temperature or UV light and a pre-determined higher temperature by monitoring color density of an indicating device comprising a first monitor capable of undergoing at least one color change in proportion to exposure to high energy radiation and a second monitor capable of monitoring integral value of time, temperature, time-temperature or exposure to UV light and a pre-determined higher temperature wherein said second monitor changes to a first color upon exposure to said time, temperature, time-temperature or UV light and said first color changes to a second color upon subsequent exposure to said pre-determined higher temperature.

13. A process of monitoring tampering of a radiation sensitive device by using an indicating device comprising a first monitor capable of undergoing at least one color change in proportion to exposure to high energy radiation and a second monitor capable of monitoring integral value of time, time-temperature, temperature or exposure to UV light and a pre-determined higher temperature for determining exposure to at least one of time, temperature, time-temperature or UV light and a pre-determined higher temperature wherein said second monitor changes to a first color upon exposure to at least one of said time, temperature, time-temperature or UV light and said first color changes to a second color upon subsequent exposure to said pre-determined higher temperature.

14. A process of monitoring tampering of a radiation sensitive device with an indicating device comprising a first monitor capable of undergoing at least one color change in proportion to exposure to high energy radiation and a second monitor capable of monitoring integral value of time, temperature, time-temperature or exposure to UV light and a predetermined higher temperature with a color bar of a color reference bar printed on it by comparing a color of the second monitor to the color bar reference wherein said second monitor changes to a first color upon exposure to at least one of said time, temperature, time-temperature or UV light and said first color changes to a second color upon subsequent exposure to said pre-determined higher temperature.

15. A process of monitoring at least one of effect of, time, temperature, time-temperature or UV light and a pre-determined higher temperature with an indicating device comprising a first monitor capable of undergoing at least one color change in proportion to high energy radiation and a second monitor capable of monitoring integral value of time, temperature, time-temperature, or exposure to UV light and a pre-determined higher temperature with an optical densitometer or a spectrophotometer by monitoring color changes in the second monitor wherein said second monitor changes to a first color upon exposure to said time, temperature or UV light and said first color changes to a second color upon subsequent exposure to said pre-determined higher temperature.

16. A process of exposing an indicating device comprising a first monitor capable of undergoing at least one color change in proportion to exposure to high energy radiation and a second monitor capable of monitoring integral value of time, temperature, time-temperature or exposure to UV light and a predetermined higher temperature wherein said second monitor changes to a first color upon exposure to said time, temperature, time-temperature or UV light and said first color changes to a second color upon subsequent exposure to said pre-determined higher temperature.

17. A monitor for high energy radiation comprising:
 a first monitor capable of changing first color density in response to a primary radiation at a first rate and in response to a second radiation at a second rate;
 a second monitor capable of changing second color density in response to said second radiation at a third rate wherein said first rate and said third rate are faster than said second rate; and
 wherein the second monitor is capable of monitoring integral value of time, temperature, time-temperature or exposure to UV light and a pre-determined higher temperature; and
 wherein each of the first monitor and the second monitor are comprised of different diacetylenes wherein said second monitor changes to a first color upon exposure to said time, temperature, time-temperature or UV light and said first color changes to a second color upon subsequent exposure to said pre-determined higher temperature.

18. The monitor of claim 17 wherein said changes first color density or said changes second color density is selected from one of colorless to blue, colorless to red, colorless to purple, blue to red or red to blue and wherein said first color density and said changes second color density are different.

19. The monitor of claim 17 wherein at least one of said first monitor or said second monitor comprises a diacetylene selected from at least one compound selected from diacetylene, partially polymerized diacetylene and polydiacetylene.

20. The monitor of claim 19 where said diacetylene is R'—C≡C—C≡C—R", where R' and R" are independently selected from: (CH$_2$)$_b$—H; (CH$_2$)$_b$OH; (CH$_2$)b-OCONH—R1; (CH$_2$)$_b$—O—CO—R1; (CH$_2$)$_b$—O—R1; (CH$_2$)$_b$—COOH; (CH$_2$)$_b$—COOM; (CH$_2$)$_b$—NH$_2$; (CH$_2$)$_b$—CONHR1; (CH$_2$)$_b$—CO—O—R1 or a mixture thereof; where b=1-10; R1 is an aliphatic or aromatic radical and M is a cation or (R1)$_3$N$^+$.

21. The monitor of claim 19 wherein said diacetylene is a derivative of one of 2,4-hexadiyn-1,6-diol, 3,5-octadiyn-1,8-diol, 4,6-decadiyn-1,10-diol, 5,7-dodecadiyn-1,12-diol or mixtures thereof.

22. The monitor of claim 19 where said diacetylene is selected from [R—C≡C—C≡C—R, where R is selected from $CH_2OCONH(CH_2)_5CH_3$; $(CH_2)_3OCONH(CH_2)_3CH_3$; $(CH_2)_4OCONHCH_2COO(CH_2)_3CH_3$; tricosa-10,12-diynoic acid, and pentacosa-10,12-diynoic acid.

23. A monitor comprising:
a first monitor comprising a first diacetylene and capable of changing first color density proportional to a dose of high energy radiation wherein said first monitor also changes first color density proportion to at least one of time, temperature, time-temperature, UV exposure or excessive heat;
a second monitor comprising a second diacetylene wherein said second monitor capable of changing second color density proportional to said at least one of, time, temperature, time-temperature, UV exposure or excessive heat wherein said second monitor changes to a first color upon exposure to said time, temperature, time-temperature or UV light and said first color changes to a second color upon subsequent exposure to said excessive temperature; and
an indicating device comprising a high energy radiation monitor capable of undergoing at least one color change in proportion to said high energy radiation and a second monitor capable of monitoring integral value of time, temperature, time-temperature, or exposure to UV light and a pre-determined higher temperature.

24. The monitor of claim 23 wherein said changing first color density or said changing second color density is selected from one of colorless to blue, colorless to red, colorless to purple, blue to red or red to blue and wherein said first color density and said changes second color density are different.

25. The monitor of claim 23 wherein at least one of said first diacetylene and said second diacetylene is selected from at least one compound selected from partially polymerized diacetylene and polydiacetylene.

26. The monitor of claim 23 where the said diacetylene is R'—C≡C—C≡C—R", where R' and R" are independently selected from: $(CH_2)_b$—H; $(CH_2)_b$OH; $(CH_2)_b$—OCONH—R1; $(CH_2)_b$—O—CO—R1; $(CH_2)_b$—O—R1; $(CH_2)_b$—COOH; $(CH_2)_b$—COOM; $(CH_2)_b$—NH_2; $(CH_2)_b$—CONHR1; $(CH_2)_b$—CO—O—R1 or a mixture thereof; where b=1-10; R1 is an aliphatic or aromatic radical and M is a cation or $(R1)_3N^+$.

27. The monitor of claim 23 wherein said diacetylene is a derivative of one of 2,4-hexadiyn-1,6-diol, 3,5-octadiyn-1,8-diol, 4,6-decadiyn-1,10-diol, 5,7-dodecadiyn-1,12-diol or mixtures thereof.

28. The monitor of claim 23 where said diacetylene is selected from [R—C≡C—C≡C—R, where R is selected from $CH_2OCONH(CH_2)_5CH3$; $(CH_2)_3OCONH(CH_2)_3CH_3$; $(CH_2)_4OCONHCH_2COO(CH_2)_3CH_3$; and tricosa-10,12-diynoic acid, and pentacosa-10,12-diynoic acid.

29. A device comprising:
a first monitor capable of undergoing at least one color change in proportion to exposure to high energy radiation; and
a second monitor capable of monitoring integral value of time, temperature, time-temperature or exposure to UV light by developing a first color and monitoring exceeding a predetermined higher temperature by said first color changing to a second color.

* * * * *